United States Patent [19]
Kishida

[11] Patent Number: 5,132,810
[45] Date of Patent: Jul. 21, 1992

[54] FLAT BED SCANNING TYPE IMAGE READER
[75] Inventor: Yoshihiro Kishida, Kyoto, Japan
[73] Assignee: Dainnippon Screen Mfg. Co., Ltd., Japan
[21] Appl. No.: 530,110
[22] Filed: May 29, 1990
[30] Foreign Application Priority Data
  May 29, 1989 [JP] Japan .................................. 1-137058
  Jun. 13, 1989 [JP] Japan .................................. 1-151419
[51] Int. Cl.$^5$ ............................................. H04N 1/24
[52] U.S. Cl. .................................................. 358/451
[58] Field of Search ................ 358/475, 480, 482–483, 358/494, 451

[56] References Cited
U.S. PATENT DOCUMENTS

| | | | |
|---|---|---|---|
| 4,386,374 | 5/1983 | Kimoto | 358/480 |
| 4,922,351 | 5/1990 | Suzuki et al. | 358/475 |
| 5,053,889 | 10/1991 | Nakano et al. | 358/480 |

FOREIGN PATENT DOCUMENTS

| | | |
|---|---|---|
| 0303960 | 2/1989 | European Pat. Off. . |
| 3615865 | 11/1986 | Fed. Rep. of Germany . |
| 49046 | 2/1989 | Japan . |
| 15050 | 3/1989 | Japan . |
| 2142499 | 1/1985 | United Kingdom . |

Primary Examiner—Stephen Brinich
Attorney, Agent, or Firm—Ostrolenk, Faber, Gerb & Soffen

[57] ABSTRACT

An image reader includes a half mirror or the like disposed in an optical path extending from an input optical system to a CCD line sensor, and a linear light source disposed in an optical path branched out by the half mirror. The linear light source is located at a position equivalent to the CCD line sensor with respect to a document table, and is equal in length to an effective pixel region of the CCD line sensor. Light emitted from the light source is projected back to the document table. An effective image reading area is displayed on the document table by relatively moving the document table and linear projected image in a sub-scanning direction. The linear light source is rotatable in accordance with a desired setting angle of an original. Consequently, an inclined image is projected back to the document table to serve as a guideline for setting the angle of the original. Where a spot light source is substituted for the linear light source, a spot image projected back to the document table is moved along a trimming area of an original. The trimming area is automatically determined by detecting distances of movement of the spot image.

5 Claims, 13 Drawing Sheets

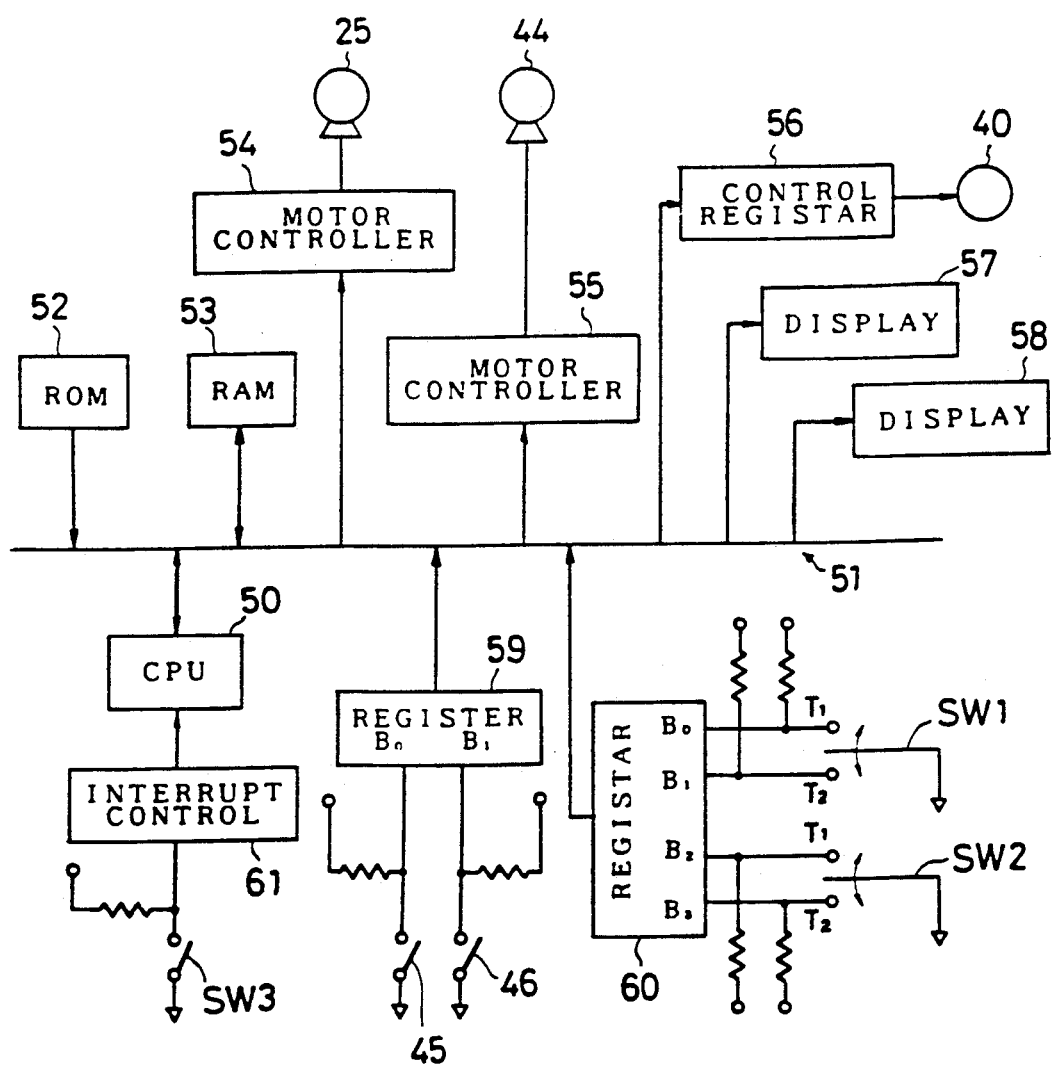

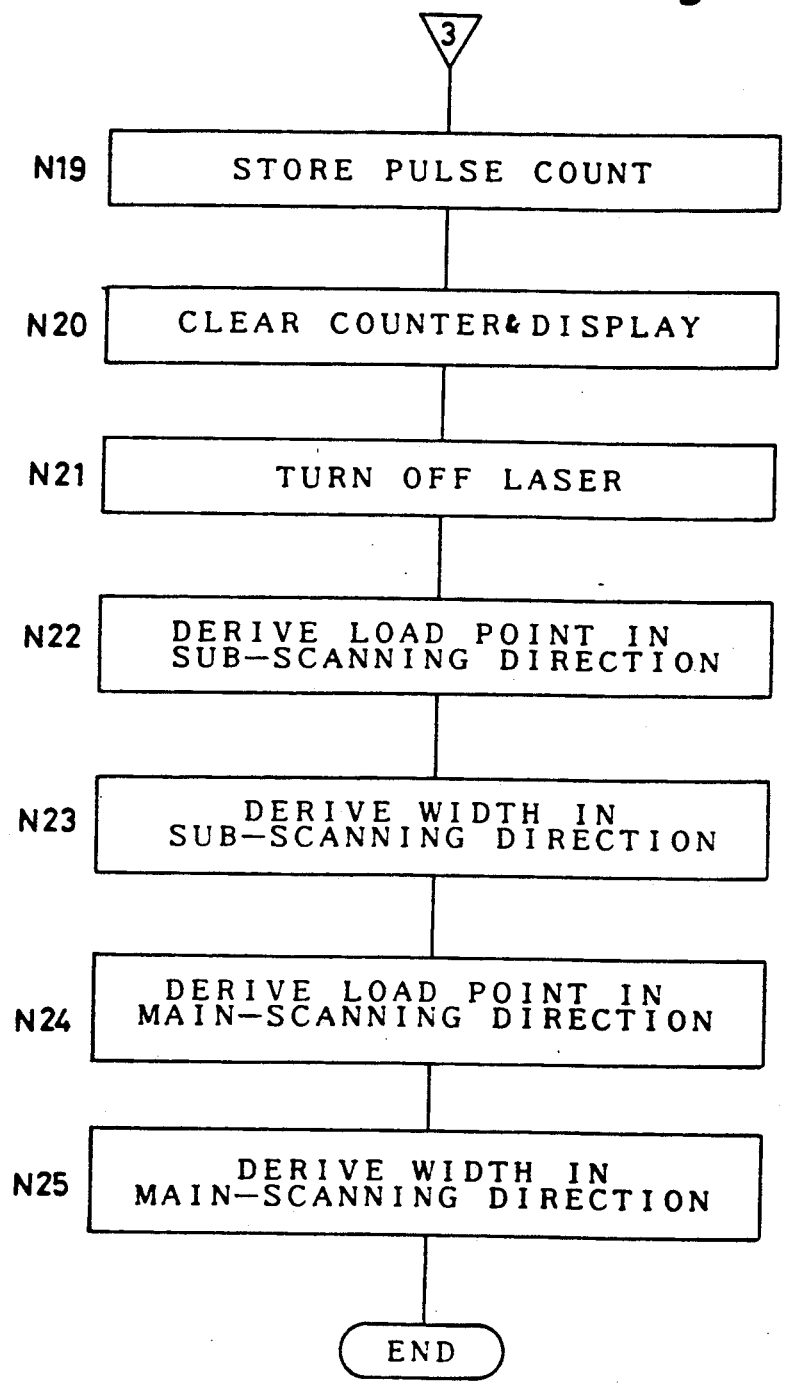

FLAT BED SCANNING TYPE IMAGE READER

BACKGROUND OF THE INVENTION (1) Field of the Invention

The present invention relates to the techniques, in an image reader of the flat bed scanning type using a CCD (charge coupled device) line sensor, of displaying optical indicators on a table to which an original is set. More particularly, the invention relates to the techniques applicable to;

(a) displaying an effective image reading area corresponding to a copying magnification ratio when enlargement selection is made for a reproduction image by varying projecting magnification of an input optical system with respect to the CCD line sensor, (b) setting an original to a document table at a desired with a main scanning direction, and (c) designating trimming areas within an original.

(2) Description of the Prior Art (a) FIG. 16 is a schematic view of an input scanning system incorporated into a conventional apparatus. FIG. 17 is a view showing an effective image reading area displayed on the conventional apparatus.

As shown in FIG. 16, the image reader of the flat bed scanning type includes a document table 1 movable in a sub-scanning direction (leftward in FIG. 16) and having a glass plate 2 to which an original to be read is set. Light flux (transmitted or reflected) from the original is passed through a linear slit for shaping, and through an input optical system including, for example, reflecting mirrors 3, 4 and 5 and a zoom lens 6, for image formation to a CCD line sensor 7. The CCD line sensor 7 includes a multiplicity of sensor elements arranged in a main scanning direction (perpendicular to the plane of the drawing), and reads the image by self-scanning these elements in the main scanning direction.

In such an image reader, enlargement selection is made by varying magnification of the zoom lens 6 to vary image areas of the original projected for image formation to the CCD line sensor 7.

When the optical magnification of the zoom lens 6 is set to double, for example, an image area is projected in half size to the CCD line sensor 7. As a result, the original size is doubled.

Similarly, when the optical magnification of the zoom lens 6 is set to half, the image area is projected in double size to the CCD line sensor 7, which results in a halved original size.

In order to read the original without deteriorating quality of the input image, the zoom lens 6 is driven to project the image over an entire effective pixel region of the CCD line sensor 7 regardless of the selected optical magnification.

When the zoom lens 6 is driven to vary magnifications as above, naturally the angle from which the zoom lens 6 views the original changes. This will readily be understood by the analogy that a zooming operation through a zoom lens attached to a single reflex camera changes the range of view seen through a viewfinder.

For the reason noted above, in the image reader of the flat bed scanning type, the effective image reading area varies in the main scanning direction with driving of the zoom lens 6 for a variation in magnification. It is therefore necessary, when setting an original to the glass plate 2 of the document table 1, to take the reproducing magnification (i.e. the magnification of the input optical system) into account and place the original within the effective image reading area.

As shown in FIG. 17, the document table 1 has a marker 8 provided on one side thereof to indicate an effective image reading area corresponding to a reproducing magnification. An original is set within the area (hatched in FIG. 17) defined between phantom lines 9a and 9b extending in the sub-scanning direction from opposite ends of the marker 8.

Further, in the copying camera disclosed in Japanese Patent Publication No. 15050/1989, a copying material supporting member defines bores in appropriate peripheral positions thereof, and an optical fiber is connected to these bores to form light emission points. A plurality of spotlights emitted from the light emission points are projected to a document table through an optical system to indicate a position for setting an original.

With the known apparatus shown in FIGS. 16 and 17, however, it is necessary to draw a plurality of markers corresponding to individual reproducing magnifications or to draw one marker having a plurality of graduations for showing effective image reading areas for the respective magnifications. In either case, the operator has difficulties in visually recognizing a correct marker or graduation corresponding to a selected reproducing magnification.

According to this apparatus, since the marker 8 is drawn outwardly of the glass plate 2 to which an original is set, the operator must use his or her own judgment to determine the phantom lines 9a and 9b shown in FIG. 17 for placing the original therebetween. This presents the problem of low original setting precision.

In the apparatus disclosed in Patent Publication No. 15050/1989, the spotlights are projected through the input optical system back to the document table for indicating the original setting positions, with spotlight images variable in accordance with reproducing magnifications. This apparatus may be said an improvement upon the illustrated known apparatus with regard to the cumbersome original setting operation. However, the operator must determine lines linking these spotlight images for setting an original within the area thus defined. An original can hardly be set promptly and precisely in this way.

The spot-like light emission points for indicating original setting positions are available only for an apparatus such as a copying camera which has a relatively large photosensitive area. In an apparatus such as an image reader of the flat bed scanning type which employs a small image pickup device such as a CCD line sensor for providing a photosensitive area, it is practically difficult to include spot-like light emission points in the effective pixel region of the CCD line sensor.

(b) In the known image reader of the flat bed scanning type, the following two methods are used to produce a layout with a read image inclined at an angle with the main scanning direction:

One such method consists in rotation of the original (image) effected through image processing as practiced with page-makeup scanners. Specifically, read image information is stored in a memory medium such as a magnetic disk, and the image is rotated by image processing on the memory. Such image processing, however, requires the memory medium to have a very large capacity for storing image information, which results in high cost of the apparatus.

In the other method, as disclosed in Japanese Patent Laying-Open Publication No. 49046/1989, the document table supporting an original is itself rotated. However, the method of rotating the document table requires a mechanism for supporting the document table to be rotatable with high precision and a mechanism for detecting rotating angles. This poses the problem of complicating mechanical components of the apparatus and thus rendering the apparatus expensive.

(c) In the known image reader of the flat bed scanning type, trimming areas of an original are designated as follows:

This type of image reader includes a document table cover for pressing from above an original placed on the document table, and a trimming frame disposed on the table cover for designating trimming areas. The trimming frame comprises a transparent sheet defining lattice sections and attached to the table cover to be movable between open and closed positions.

For designating trimming areas of an original, the trimming frame is opened, the original is set face up in a selected position on the table cover, and then the trimming frame is closed. In this state, the original and the lattice sections superposed thereon are visually observable from above the transparent trimming frame.

The operator, utilizing the lattice sections, reads coordinates of desired trimming areas of the original, and designates the trimming areas by inputting the coordinates through keys on a control panel.

According to the known apparatus, however, reading errors due to parallax tend to occur since the trimming areas of an original are visually read using the lattice sections. Thus, there is a problem of failing to assure precise designation of trimming areas.

In addition, designation of trimming areas is a cumbersome and time-consuming task with the need to read coordinates of trimming areas and then key-input the coordinates.

SUMMARY OF THE INVENTION

The general object of the present invention is to solve the problems of the known apparatus as noted above.

A specific object of the present invention is to provide an image reading apparatus of the flat bed scanning type, which allows an original to be set within an effective image reading area on a document table with speed and precision.

Another specific object of the present invention is to provide an image reading apparatus of the flat bed scanning type, which allows an original to be set at an angle with a main scanning direction in a relatively simple and easy operation.

A further specific object of the present invention is to provide an image reading apparatus of the flat bed scanning type, which allows trimming areas of an original to be designated with high precision and yet with speed.

Other objects and advantages of the present invention will be apparent from the detailed description to follow.

In order to achieve the above and other objects, the present invention, in accordance with one aspect thereof, provides a flat bed scanning type image reading apparatus for focusing light flux from an original placed on a document table through an input optical system to a CCD line sensor, reading an image through the CCD line sensor in a main scanning direction, effecting a sub-scan by moving the document table and the light flux relative to each other, and effecting enlargement selection for a reproduction image by varying projecting magnification of the input optical system relative to the CCD line sensor. A light reflecting device is disposed in an optical path extending from the input optical system to the CCD line sensor to cause a branching of the optical path. A linear light source is disposed in the optical path branched out by the light reflecting device, at a position equivalent to the CCD line sensor with respect to the document table. The linear light source is equal in length to an effective pixel region of the CCD line sensor. A projected image moving device is provided for moving an image of the linear light source projected back to the document table through the light reflecting device and input optical system, relative to the document table in a sub-scanning direction.

According to this aspect of the invention, linear light having the same length as the effective pixel region of the CCD line sensor is emitted from a position equivalent to the CCD line sensor, and projected back to the document table. The projected image therefore has a length automatically variable with an optical magnification of the input optical system and constantly corresponding to the effective pixel region of the CCD line sensor. Moreover, since the projected image is movable on the document table in the sub-scanning direction, the operator can recognize an effective image reading area directly on the document table. The operator has only to set an original within an area delimited by opposite ends of the projected image. Thus, the original may be set promptly and precisely.

In accordance with another aspect of the invention, the objects of the invention are achieved in a flat bed scanning type image reading apparatus for focusing light flux from an original placed on a document table through an input optical system to a CCD line sensor, reading an image through the CCD line sensor in a main scanning direction, effecting a sub-scan by moving the document table and the light flux relative to each other, and effecting enlargement selection for a reproduction image by varying projecting magnification of the input optical system relative to the CCD line sensor. A light reflecting device is disposed in an optical path extending from the input optical system to the CCD line sensor to cause a branching of said optical path, and a linear light source is disposed in the optical path at a position equivalent to the CCD line sensor with respect to the document table. The linear light source is equal in length to an effective pixel region of the CCD line sensor. A linear light source driving device, responsive to a displacement angle setting device, is provided for rotating the linear light source in a plane perpendicular to an optical axis thereof to a desired angle of rotation. A projected image moving device is provided for moving an image of the linear light source projected back to the document table through the light reflecting device and input optical system, relative to the document table in a sub-scanning direction.

In accordance with this aspect when the linear light source is set to a position extending in the same direction as the CCD line sensor, the effective image reading area corresponding to the optical magnification of the input optical system is displayed on the document table, as in the construction (a) above, by relatively moving the projected image of the linear light source and the document table in the sub-scanning direction.

On the other hand, when an original is set at an angle with the main scanning direction, an original setting angle is input through the displacement angle setting device. Then the linear light source driving device rotates the linear light source and sets the latter to that selected angle. Consequently, the image of the linear light source is projected back to the document table as inclined at the selected angle with the main scanning direction. The operator has only to set the original along this projected image.

In still another aspect of the invention, the objects of the invention are achieved in a flat bed scanning type image reading apparatus for projecting light flux from an original placed on a document table through an input optical system to a CCD line sensor, reading an image through the CCD line sensor in a main scanning direction, and effecting a sub-scan by moving the document table and the light flux relative to each other. A light reflecting device disposed in an optical path extending from the input optical system to the CCD line sensor to cause a branching of said optical path, and a spot light source is disposed in the branched optical path at a position equivalent to the CCD line sensor with respect to the document table. A first driving device is provided for moving a projection image of the spot light source, projected back to the document table through the light reflecting device and the input optical system, on the document table in the main scanning direction. A second driving device is provided for moving the projection image on the document table in a sub-scanning direction. First and second detecting devices are provided for detecting distances of movement of the projection image in the main scanning direction, respectively. A trimming area calculating device for calculating a trimming area based on the distances of movement detected by the first detecting device and the second detecting device when the projection image is moved to selected locations relating to the trimming area of the original placed on the document table.

When the spot light source is lit for designating a trimming area of an original, its light is projected back through the light reflecting device and input optical system to the original placed on the document table. Then the first and second driving devices move the projected image to a home position or origin on the document table. Subsequently, the projected image is moved in the main and sub-scanning directions to selected points of the trimming area. The first and second detecting devices detect distances of movement from the home position to the selected points, respectively. Based on these distances of movement, the trimming area calculating device calculates the trimming area.

Thus, according to the present invention, a trimming area is automatically designated by moving the projected image along the trimming area. This construction enables a trimming area to be designated precisely and speedily, compared with the conventional apparatus in which a trimming area is visually read utilizing lattice sections and is then input through keys.

BRIEF DESCRIPTION OF THE DRAWINGS

For the purpose of illustrating the invention, there is shown in the drawings several forms which are presently preferred, it being understood, however, that the invention is not limited to the precise arrangements and instrumentalities shown.

FIG. 11 is a block diagram of a control system in the apparatus shown in FIG. 9, FIGS. 12A through 12C are flowcharts of an operating sequence of the apparatus shown in FIG. 9.

DETAILED DESCRIPTION OF THE PREFERRED EMBODIMENTS

Some embodiments of the present invention will be described hereinafter with reference to the drawings.

FIRST EMBODIMENT

Figure 1:
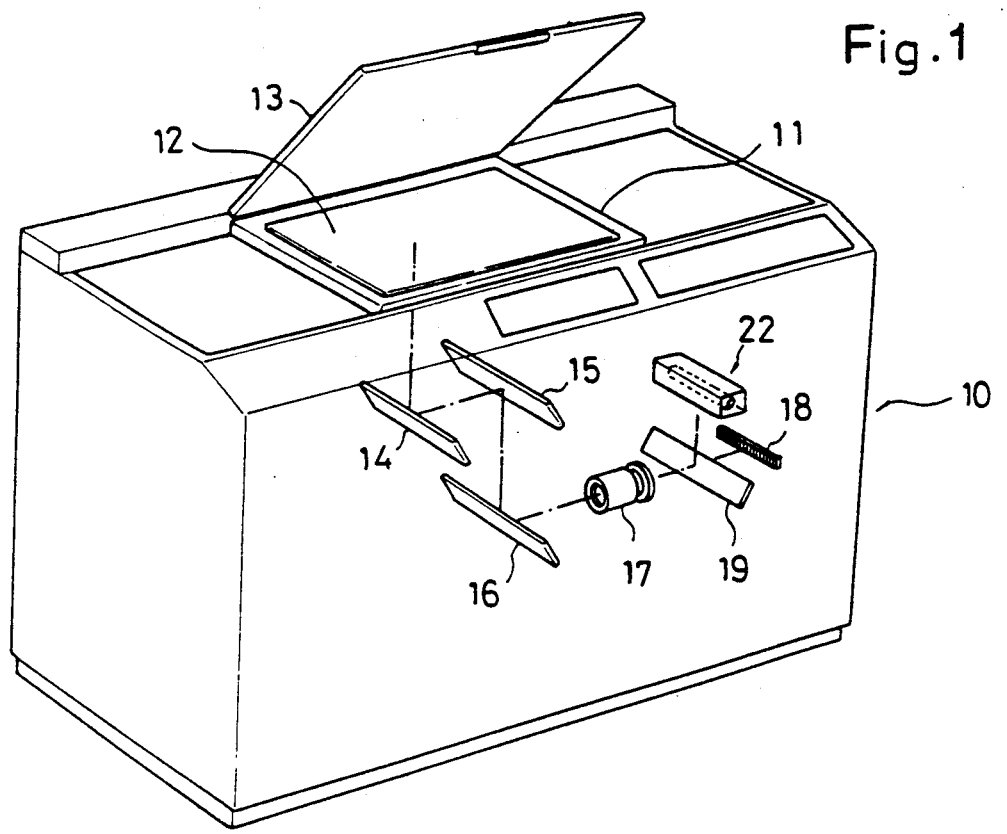
FIG. 1 is a perspective view of an image reading apparatus of the flat bed scanning type in a first embodiment of the present invention, partially transparent to reveal some of its principal components.
Figure 2:
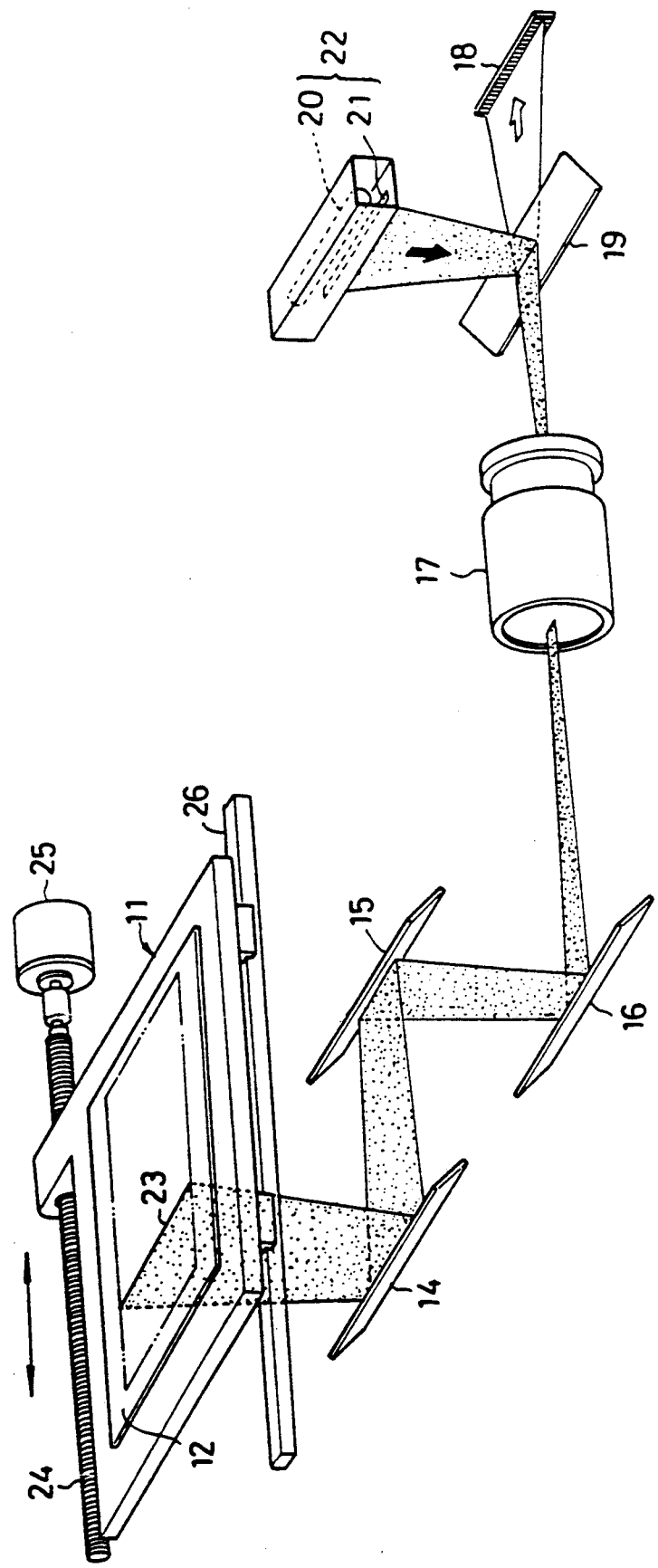
FIG. 2 is an enlarged perspective view of the principal components of the apparatus shown in FIG. 1.

FIGS. 1 and 2 show a preferred embodiment of the present invention.

Referring to FIG. 1, an image reading apparatus of the flat bed scanning type 10 comprises a document table 11 horizontally movable in a sub-scanning direction. The document table 11 includes a glass plate 12 to which an original is set. Numeral 13 denotes a document table cover movable between an open position and a closed position for fixing the original placed on the glass plate 12. The image reading apparatus 10 contains, among other components, an image reading optical system.

Figure 16:
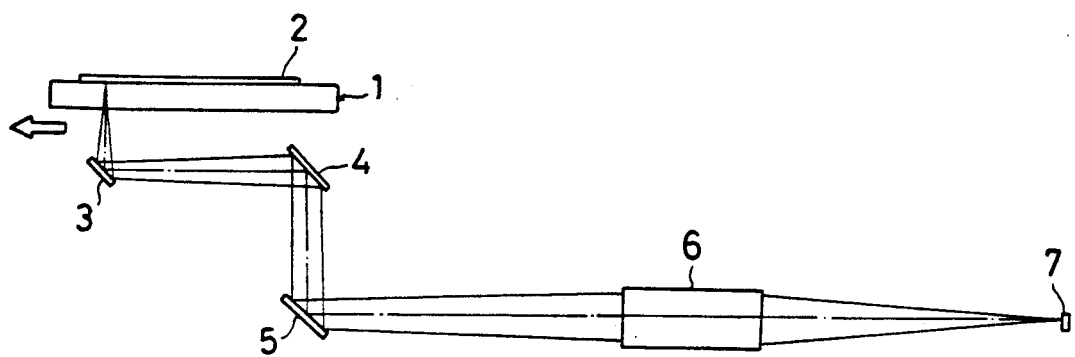
FIG. 16 is a schematic view of principal components of a conventional image reading apparatus of the flat bed scanning type described above.
Figure 17:
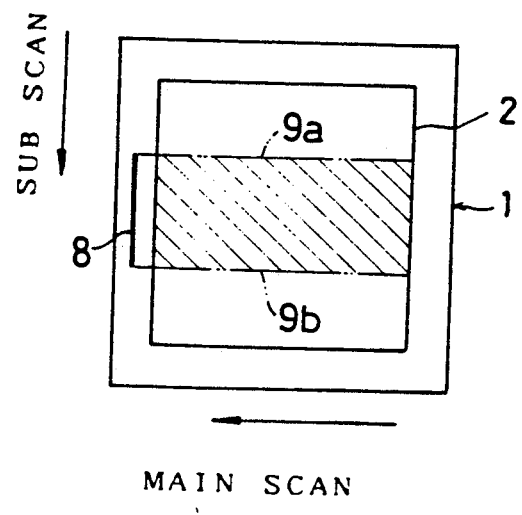
FIG. 17 is an explanatory view showing an effective image reading area displayed on the conventional apparatus shown in FIG. 16.

Referring to FIG. 2 next, below the document table 11 there are reflecting mirrors 14, 15 and 16, a zoom lens 17 acting as an input optical system for varying magnification, and a CCD line sensor 18 for reading images. Light flux (transmitted or reflected) from the original is passed through a linear slit, not shown, for shaping, reflected successively by the reflecting mirrors 14, 15 and 16 and focused through the zoom lens 17 to the CCD line sensor 18. So far this embodiment is the same as the conventional apparatus shown in FIG. 16.

This embodiment has a characterizing construction as set out hereunder. A half mirror 19 is disposed on an optical path between the zoom lens 17 and CCD line sensor 18 to act as a light reflecting device. A linear light source 22 is disposed on an optical path branched out by the half mirror 19. This linear light source 22 is located in a position equivalent to the CCD line sensor 18 with respect to the document table 11 (more particularly the original placed on the glass plate 12), that is a position on the branched optical path at the same distance to the half mirror 19 as the CCD line sensor 18 is to the half mirror 19. The linear light source 22 includes an elongated halogen lamp 20 and a slit 21 having the same length as the effective pixel region of the CCD line sensor 18. Further, a projected image moving device is provided for moving, relative to the document table 11 in the sub-scanning direction, an image 23 of the linear light source 22 projected back to the document table 11.

The projected image moving device in this embodiment acts also as a mechanism for moving the document table 11 in the sub-scanning direction. Specifically, the image moving device includes a screw shaft 24 meshed with one end of the document table 11, a stepper motor 25 connected to the screw shaft 24, and a guide rail 26 engaged with the other end of the document table 11.

When an original is set to the glass plate 12 of the document table 11, a linear light having the same length as the effective pixel region of the CCD line sensor 18 is emitted from the linear light source 22. This linear light is reflected by the half mirror 19 and enters the zoom lens 17. After being focused by the zoom lens 17, the light is reflected successively by the reflecting mirrors 16, 15 and 14 for travelling to the glass plate 12 of the document table 11. As a result, the back projected linear image 23 appears on the glass plate 12 as shown in FIG. 2.

The linear light is emitted from the linear light source 22 having the same length as the effective pixel region of the CCD line sensor 18 and located at the position optically equivalent to the position of the CCD line sensor 18 with respect to the document table 11. This linear light is projected back to the glass plate 12 through the same zoom lens 17 used in image reading. Consequently, the length of the projected image 23 is variable with the optical magnification of the zoom lens 17, and its total length is equal to an effective image reading area corresponding to the effective pixel region of the CCD line sensor 18.

When the optical magnification of the zoom lens 17 is set to double, for example, the length of projected image 23 (i.e. the effective image reading area) becomes half its length for real-size reproduction. When the optical magnification of the zoom lens 17 is set to half, the length of projected image 23 becomes twice its length for real-size reproduction.

The projected image 23 may be displayed at any desired position on the glass plate 12 by driving the stepper motor 25 to move the document table 11 in the sub-scanning direction. It is easy to recognize the effective image reading area defined between imaginary lines extending in the sub-scanning direction from opposite ends of the projected image 23 (the area enclosed in the two-dot-and-dash lines in FIG. 2). The operator may just set an original within this area.

After the original is set within the area indicated by the projected image 23 as above, the linear light source 22 is turned off to give way to reading of the original image. Then the light flux (transmitted or reflected) from the original is projected to the CCD line sensor 18 through the reflecting mirrors 14, 15 and 16, zoom lens 17 and half mirror 19 as described hereinbefore.

SECOND EMBODIMENT

Figure 3:
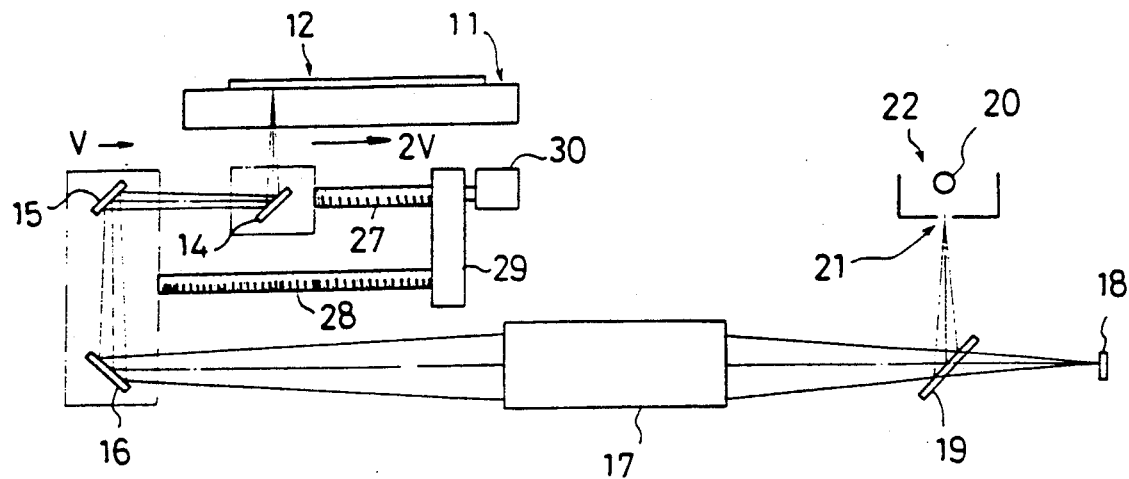
FIG. 3 is a schematic view of a second embodiment of the present invention.

FIG. 3 is a schematic view of a principal portion of an image reading apparatus of the flat bed scanning type in a second embodiment of the present invention.

In FIG. 3, like parts are labelled with like reference numerals with respect to the first embodiment shown in FIGS. 1 and 2, and are not described here.

In the first embodiment, the document table 11 is moved with the result that the projected image 23 moves on the glass plate 12. In this embodiment, the document table 11 is fixed and the projected image 23 itself is movable in the sub-scanning direction.

The projected image moving device in this embodiment includes a screw shaft 27 meshed with a support member, not shown, which supports the reflecting mirror 14, and a screw shaft 28 meshed with a support member, not shown, which supports the reflecting mirrors 15 and 16. The screw shafts 27 and 28 are connected through a gearbox 29 to a stepper motor 30. To scan the original in the sub-scanning direction, the stepper motor 30 is driven to move the reflecting mirror 14 at velocity 2V in the sub-scanning direction and to move the group of reflecting mirrors 15 and 16 in the sub-scanning direction at velocity V which is half the velocity 2V of the reflecting mirror 14.

This apparatus also includes the half mirror 19 interposed between the zoom lens 17 and CCD line sensor 18 as in the first embodiment. The linear light source 22 is located on the optical path branched out by the half mirror 19, in the position equivalent to the CCD line sensor 18.

With this construction, as in the first embodiment, the image of the linear light source 22 having the length corresponding to the effective pixel region of the CCD line sensor 18 is projected back to the glass plate 12 to be movable thereon.

THIRD EMBODIMENT

Figure 4:
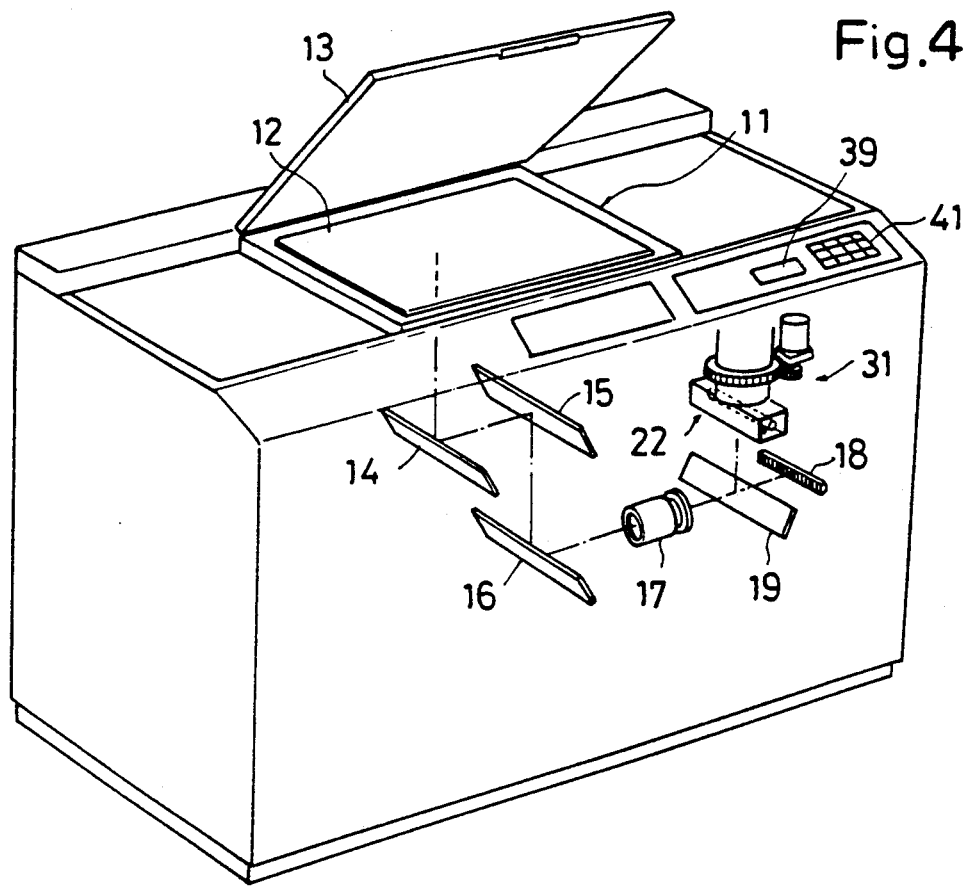
FIG. 4 is a perspective view of an image reading apparatus of the flat bed scanning type in another embodiment of the present invention, partially transparent to reveal some of its principal components.
Figure 5:
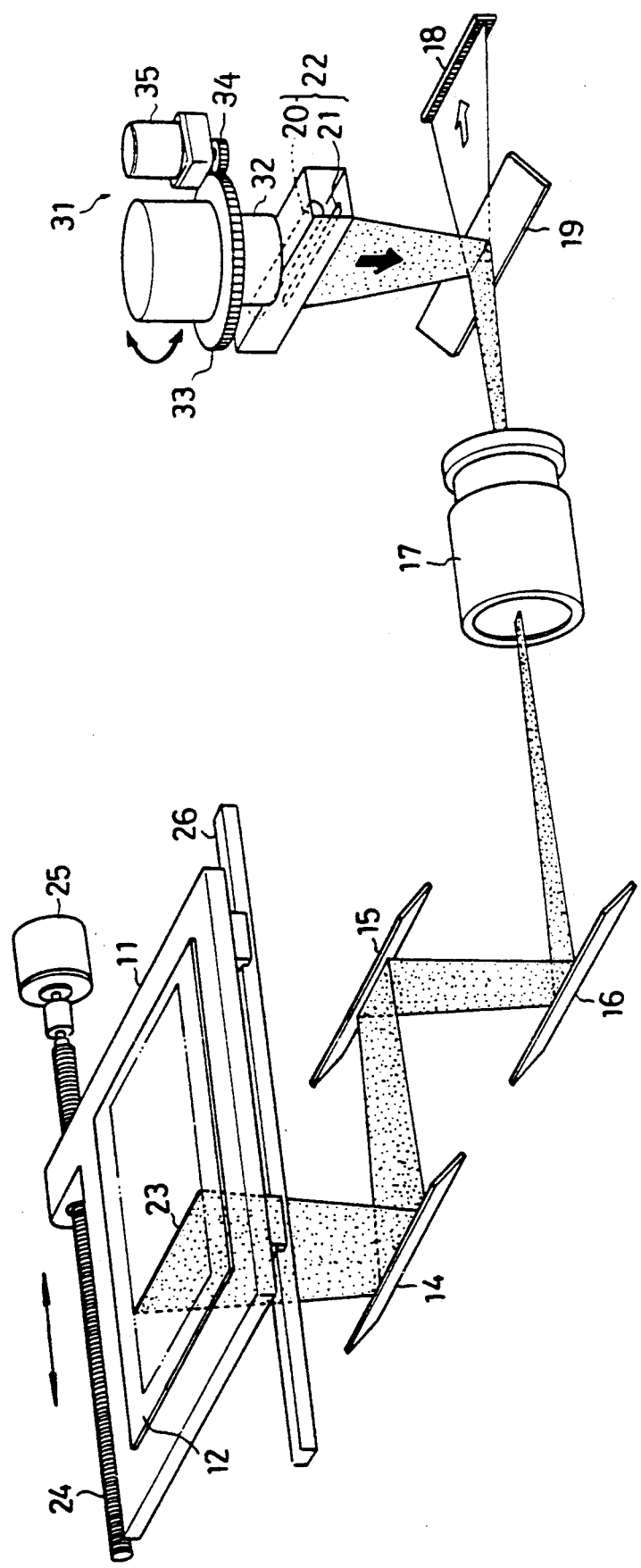
FIG. 5 is an enlarged perspective view of the principal components of the apparatus shown in FIG. 4.

FIGS. 4 and 5 show another embodiment of the present invention.

In these figures, like parts are labelled with like reference numerals with respect to the first embodiment shown in FIGS. 1 and 2, and are not described here.

This embodiment is characterized by the feature that the linear light source 22 is rotatable in a plane perpendicular to its optical axis. When the linear light source 22 is set to a home position (as in FIG. 5) extending in the same direction as the CCD line sensor 18, an effective image reading area is indicated by the projected image 23 which is movable on the glass plate 12 by driving the document table 11 in the sub-scanning direction as in the first embodiment. When an original is to be set at an angle with the document table 11 for reading its image, the linear light source 22 is rotated through the corresponding angle as described later. Then the original may be set at that particular angle, using the projected image 23 appearing on the glass plate 12 as a guideline.

As shown in FIGS. 4 and 5, a linear light source drive mechanism 31 is provided as a device for rotating the linear light source 22. This mechanism 31 includes a rotary shaft 32 for supporting the linear light source 22 to be rotatable in a plane perpendicular to its optical axis, a driven gear 33 connected to the rotary shaft 32, a drive gear 34 meshed with the driven gear 33, and a stepper motor 35 connected to the drive gear 34.

Figure 6:
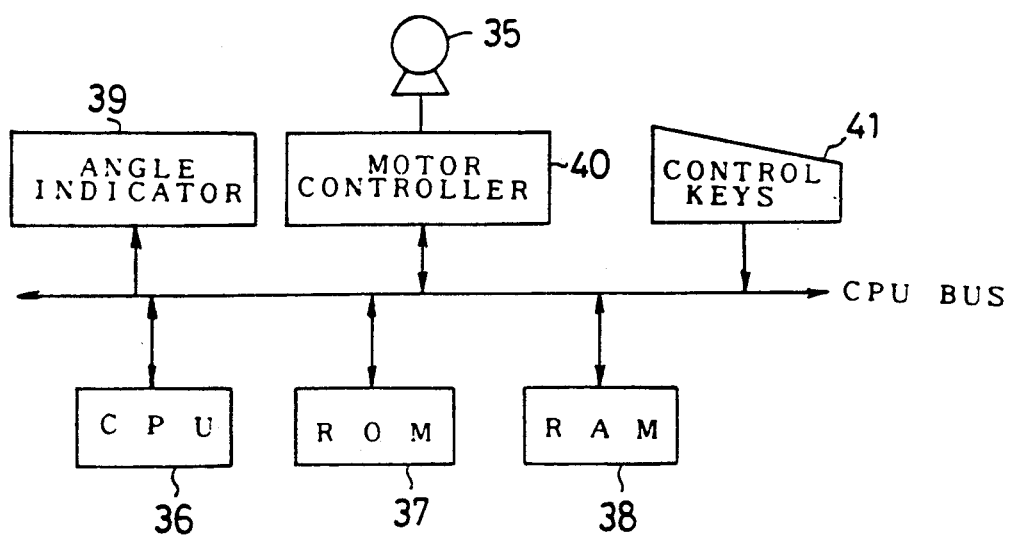
FIG. 6 is a block diagram of a control system in the apparatus shown in FIG. 4.

FIG. 6 is a block diagram of a control system for controlling the linear light source drive mechanism 31.

Numeral 36 denotes a CPU for calculating the number of pulses to be applied to the stepper motor 35 to rotate the linear light source 22 through a designated angle. Numeral 37 denotes a ROM for storing a control sequence; numeral 38 a RAM for storing input data and the like; numeral 39 an angle indicator; numeral 40 a motor controller for controlling the stepper motor 35; and numeral 41 control keys for inputting a rotating angle of the linear light source 22.

Figure 7:
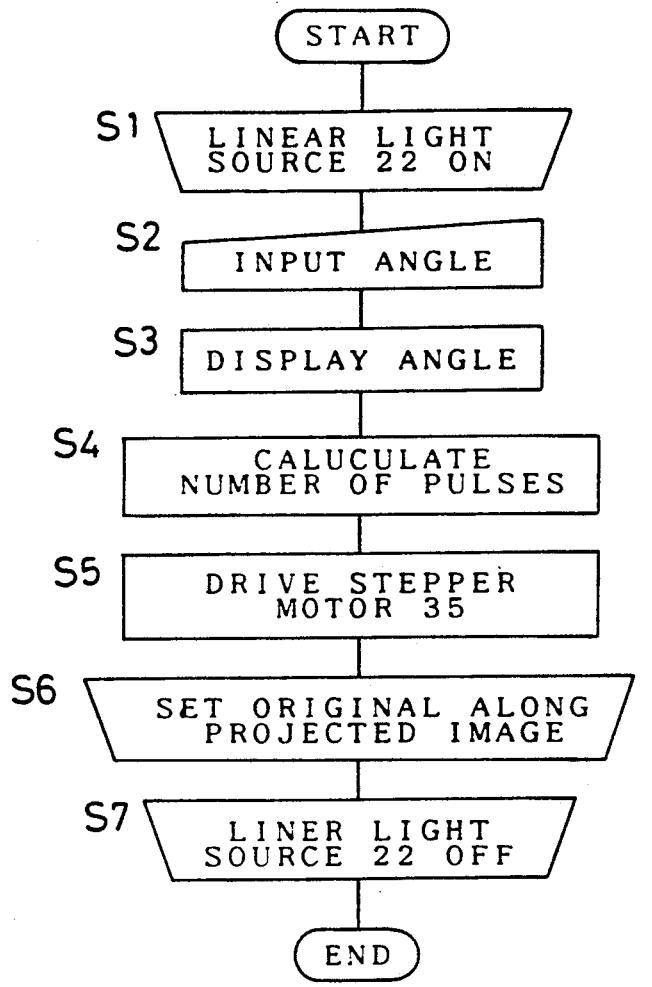
FIG. 7 is a flowchart of an operating sequence of the apparatus shown in FIG. 4.

The operating sequence of this embodiment will be described next with reference to the flowchart shown in FIG. 7.

Figure 8:
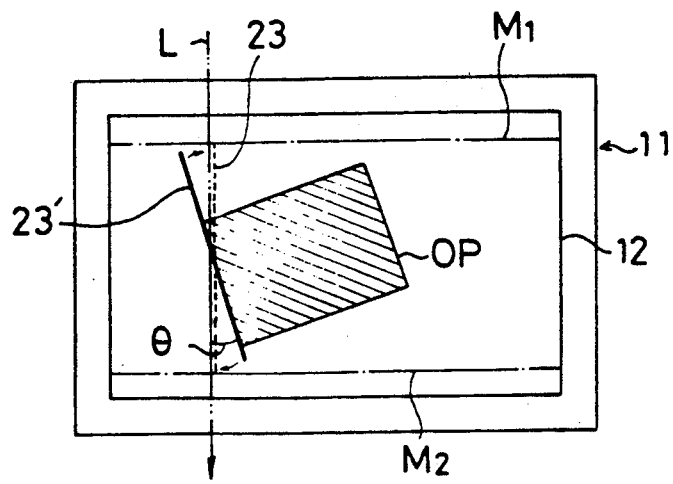
FIG. 8 is an explanatory view illustrating a way in which an original is set along an image projected back to the document table of the apparatus shown in FIG. 4.

Assume that an original is to be set on the document table 11 at an angle $\theta$ to a main scanning line L shown in phantom line in FIG. 8. The operator first turns on the linear light source 22 (step S1). Next, the operator inputs rotating angle $\theta$ through the control keys 41 (step S2). The rotating angle $\theta$ input is displayed by the angle indicator 39 for confirmation by the operator (step S3). Based on the rotating angle $\theta$, CPU 36 calculates the number of pulses N for application to the stepper motor 35 as follows (step S4).

If the stepper motor 35 is rotatable through an angle $\Delta d$ per pulse, the resulting angle of rotation d of the linear light source 22 is expressed by the following equation:

$$d = \Delta d \cdot \frac{n}{m} \quad (1)$$

where n is the number of teeth on the drive gear 34, and m is the number of teeth on the driven gear 33. Then, the number of pulses N required for rotating the linear light source 22 through the foregoing angle $\theta$ is derived from the following equation:

$$N = \frac{\theta}{d} = \frac{\theta}{\Delta d} \cdot \frac{m}{n} \quad (2)$$

After calculating the required number of pulses N as above, CPU 36 gives the motor controller 40 a command to output N pulses, whereby the stepper motor 35 is driven to rotate the linear light source 22 through the angle $\theta$ (step S5). Consequently, as shown in FIG. 8, the image 23' of the linear light source 22 projected back to the glass plate 12 through the half mirror 19, zoom lens 17, and reflecting mirrors 16, 15 and 14 is inclined at the angle $\theta$ to the main scanning line L. Using this projected image 23' as a guideline, the operator is able to set the original OP at the desired angle $\theta$ with ease (step S6).

When it is desired to confirm that the original OP thus set is within the effective image reading area, the linear light source 22 is returned to the home position extending along the main scanning line. Numeral 23 in FIG. 8 indicates the projected image corresponding to the home position. Then the document table 11 is reciprocated to move the projected image 23 in the sub-scanning direction, for the operator to check if the original OP is within the area between loci of the opposite ends of the projected image 23 (i.e. between dot-and-dash lines M1 and M2 in FIG. 8).

After the original OP is set in position as above, the linear light source 22 is turned off (step S7) for an image reading operation.

In the embodiment shown in FIGS. 4 and 5, the document table 11 is movable to move the projected image 23 in the sub-scanning direction. However, as in the apparatus shown in FIG. 3, the reflecting mirrors 14, 15 and 16 may be adapted movable to move the projected image 23.

FOURTH EMBODIMENT

Figure 9:
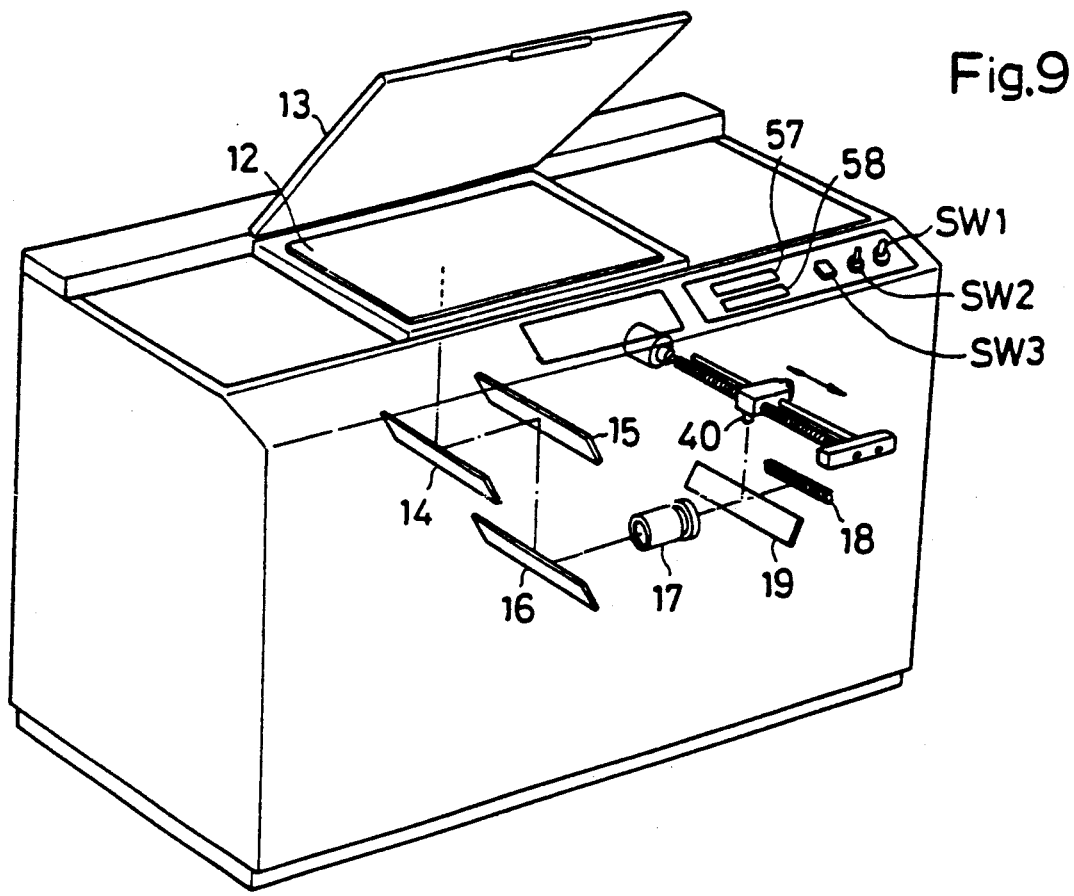
FIG. 9 is a perspective view of an image reading apparatus of the flat bed scanning type in a further embodiment of the present invention, partially transparent to reveal some of its principal components.
Figure 10:
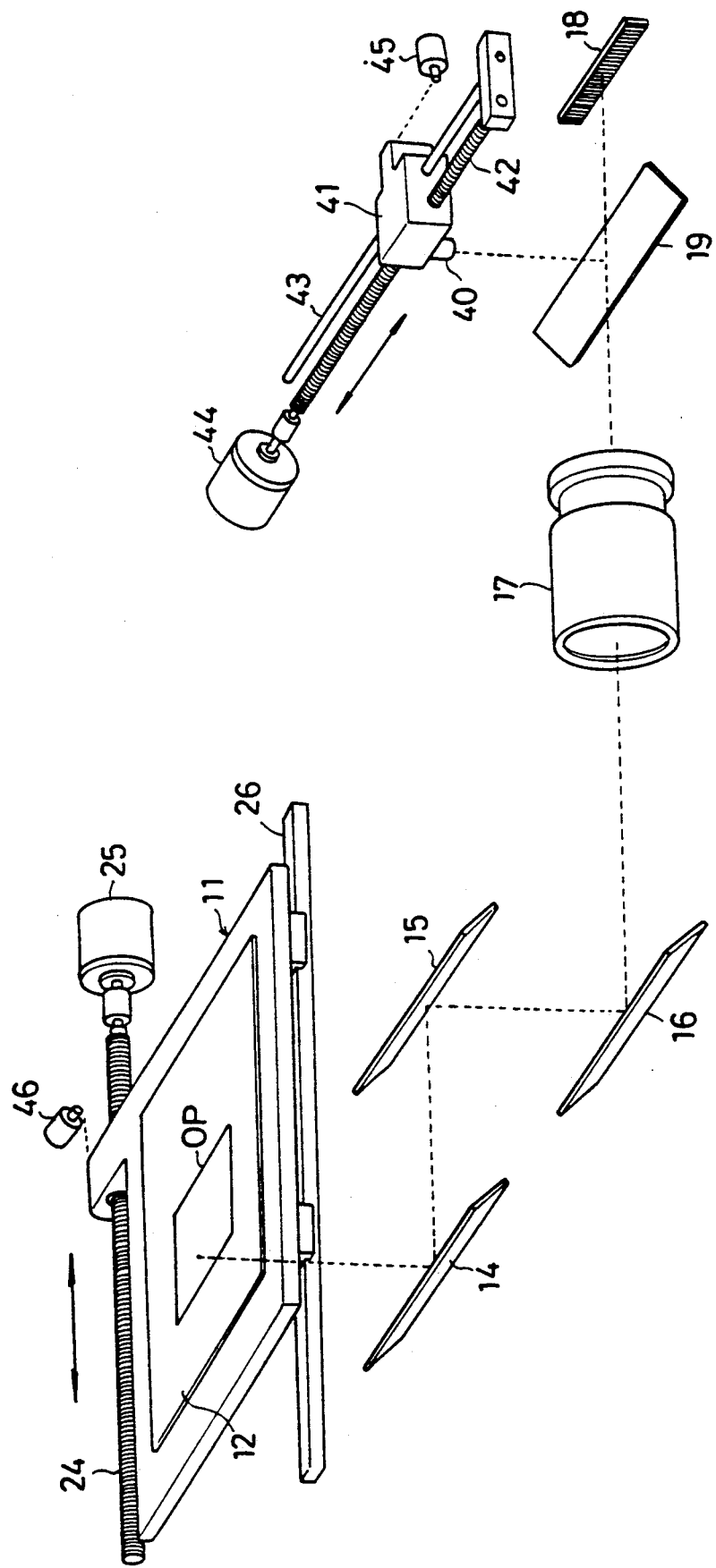
FIG. 10 is an enlarged perspective view of the principal components of the apparatus shown in FIG. 9.

FIGS. 9 and 10 show a further embodiment of the present invention.

In these figures, like parts are labelled with like reference numerals with respect to the first embodiment shown in FIGS. 1 and 2.

The characterizing feature of this embodiment lies in that a trimming area is automatically derived from movement, along the trimming area, of the image of a spot light source projected back to the glass plate 12.

Specifically, as shown in FIG. 10, a spot light source such as a visible semiconductor laser 40 is disposed on the optical path branched out by the half mirror 19 acting as the light reflecting device. The laser 40 is located in the position equivalent to the CCD line sensor 18 with respect to the document table 11.

The laser 40 is secured to a movable laser deck 41 meshed with a screw shaft 42 and fitted on a guide rail 43. The screw shaft 42 is rotatable by a stepper motor 44 connected to one end thereof, to move the laser deck 41 in the direction (main scanning direction) perpendicular to the direction (sub-scanning direction) of movement of the document table 11. This drive mechanism includes a home position sensor 45 for detecting home position of the main scan. The home position sensor 45 is fixed to a predetermined position, so that the position on an original OP corresponding to the home position coincides with the foremost one of the effective pixels of the CCD line sensor 18.

The document table 11 carries a home position sensor 46 for detecting home position for the sub-scan.

The reflecting mirrors 14, 15 and 16 and zoom lens 17 constitute the input optical system for reading the image of the original OP. Light transmitted through the original OP set on the document table 11 travels through the input optical system to the CCD line sensor 18. The zoom lens 17 is constructed to project the original image to the CCD line sensor 18.

A control system in this embodiment will be described next with reference to FIG. 11.

The control system includes a CPU 50 which has functions for detecting and trimming area calculating. Such functions will particularly be described in relation to the operation of this embodiment. CPU 50 is connected through a bus line 51 to a ROM 52 for storing programs, a RAM 53 for storing data, a motor controller 54 for controlling the stepper motor 25, a motor controller 55 for controlling the stepper motor 44, a control register 56 for controlling the laser 40, a display 57 for displaying distances of movement in the main scanning direction, a display 58 for displaying distances of movement in the sub-scanning direction, and registers 59 and 60.

The register 59 stores states of the home position sensors 45 and 46. The register 60 stores states of a switch SW1 for driving the movable laser deck 41 and of a switch SW2 for driving the document table 11, respectively. CPU 50 constantly polls and monitors the states of the registers 59 and 60.

Switches SW1 and SW2 are momentary type switches controllable by the operator. When switches SW1 and SW2 are in neutral, terminals B0–B3 of the register 60 are set to "1". When switches SW1 and SW2 are connected to contacts T1, terminal B0 is set to "0" terminal B1 is set to "1", terminal B2 is set to "0" and terminal B3 is set to "1". When switches SW1 and SW2 are connected to contacts T2, terminal B0 is set to "1", terminal B1 is set to "0", terminal B2 is set to "1" and terminal B3 is set to "0".

In response to the levels of terminals B0–B3 of the register 60, CPU 50 outputs appropriate pulse signals to the motor controllers 54 and 55 to drive the movable laser deck 41 and document table 11 as follows:

The laser deck 41 is maintained stationary when terminals B0 and B1 are both "1", driven toward the home position in the main scanning direction when terminal B0 is "1" and terminal B1 is "0", and driven away from the home position when terminal B0 is "0" and terminal B1 is "1".

The document table 11 is maintained stationary when terminals B2 and B3 are both "1", driven toward the home position in the sub-scanning direction when terminal B2 is "1" and terminal B3 is "0", and driven away from the home position when terminal B2 is "0" and terminal B3 is "1".

A switch SW3 is connected to CPU 50 through an interrupt control circuit 61. This switch SW3 is controlled by the operator when the image of the spot light source projected to the document table 11 coincides with a desired point in the trimming area.

Figure 13:
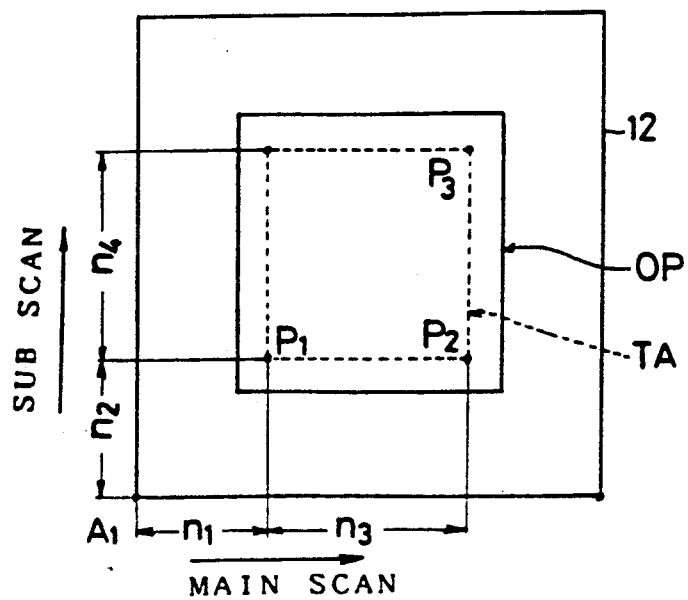
FIG. 13 is an explanatory view illustrating an example of trimming areas of an original designated on the apparatus shown in FIG. 9.
Figure 12A:
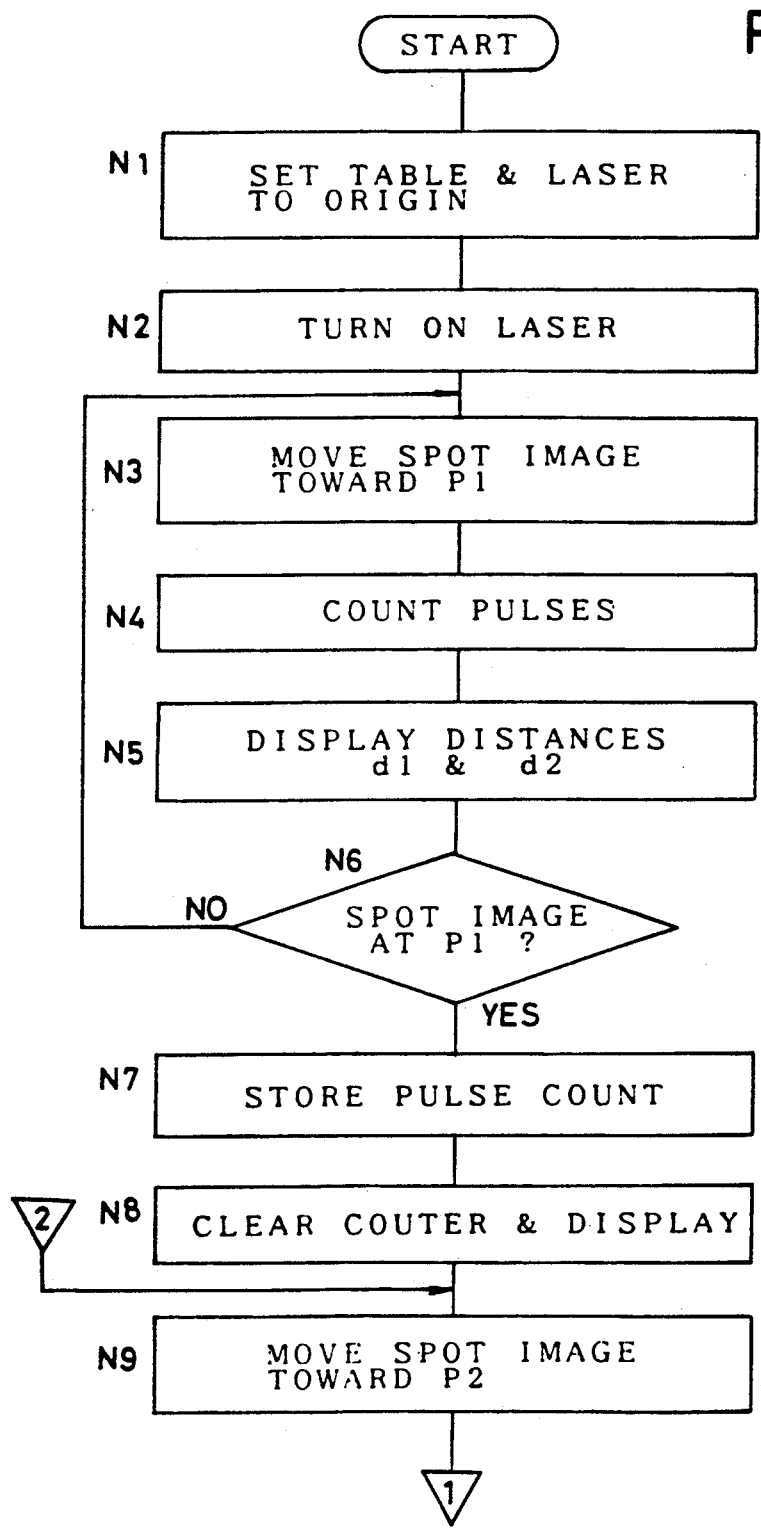
Figure 12B:
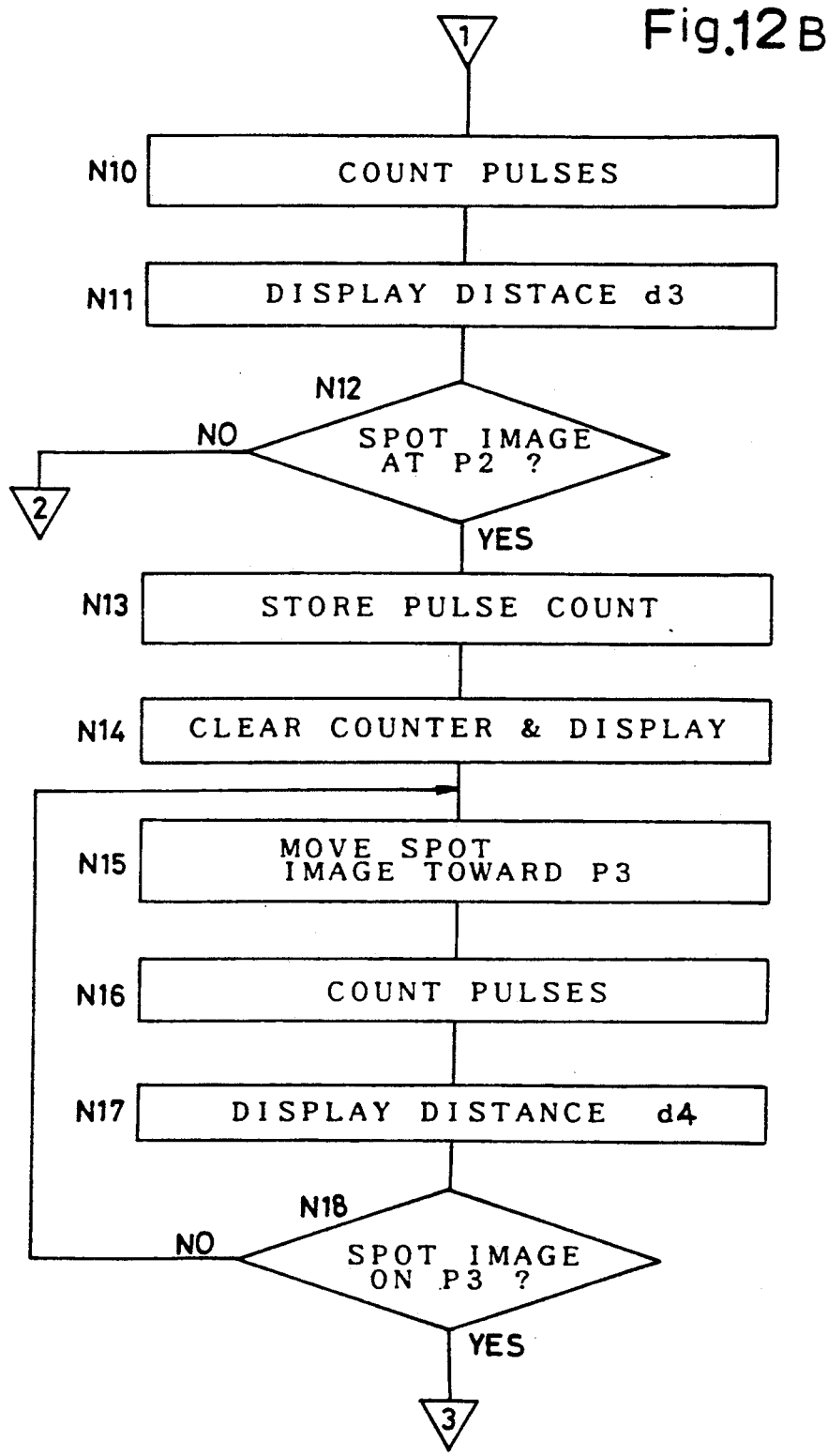

The operating sequence for designating a trimming area with the apparatus in this embodiment will be described next with reference to the flowcharts shown in FIGS. 12A through 12C and with reference to FIG. 13. FIG. 13 is a plan view of an original OP placed on the glass plate 12 of the document table 11.

Step N1: The switches SW1 and SW2 are connected to contacts T2 to return the document table 11 and movable laser deck 41 to the respective home positions. As a result, terminal B0 of the register 60 is set to "1", terminal B1 to "0", terminal B2 to "1" and terminal B3 to "0". In response to the states of terminals B0–B3, CPU 50 outputs the pulse signals to the motor controllers 54 and 55 to drive the laser deck 41 and document table 11 toward the home positions.

When the document table 11 and laser deck 41 reach the respective home positions, the home position sensors 45 and 46 are operated to set the terminals B0 and B1 of register 56 to "0". Then CPU 50 terminates the pulse signals to the motor controllers 54 and 55, whereby the laser deck 41 and document table 11 stop at the home positions.

Step N2: Subsequently, CPU 50 outputs a laser drive signal to the control register 56 to turn on the laser 40. The beam emitted from the laser 40 travels through the half mirror 19, zoom lens 17 and reflecting mirrors 16, 15 and 14 to the glass plate 12. Thus, a spot image is projected back to the location on the glass plate 12 corresponding to the home position. Reference A1 in FIG. 13 represents the projected spot image lying at the home position.

Steps N3 through N6: When the projected spot image is set to the home position or origin A1, the switches SW1 and SW2 are operated again to drive the movable laser deck 41 and document table 11 until the projected image, as shown in FIG. 13, coincides with a first point P1 of a desired rectangular trimming area TA (shown in a dotted line in FIG. 13) of the original OP.

At this time CPU 50 counts the numbers of pulses in the pulse signals applied to the motor controllers 54 and 55. The pulses are counted up when the projected image moves away from the home position A1, and down when the image moves toward the home position A1.

Distance of movement d1 in the main scanning direction of the projected image is expressed by the following equation:

$$d1 = l1 \times n1 \qquad (3)$$

where l1 is a minimum distance of movement of the movable laser deck 41 per pulse in the pulse signal applied to the motor controller 55 for main scan control, and n1 is a count of pulses in the pulse signal applied to the motor controller 55.

The screw shaft 42 has a predetermined pitch so that the minimum distance of movement l1 is an integral multiple of the pixel-to-pixel pitch of the CCD line sensor 18.

As the pulse signal for the main scan control is outputted to the motor controller 55, CPU 50 calculates, from the above equation (3), the distance of movement d1 in the main scanning direction of the projected image. The result is shown on the display 57.

Similarly, distance of movement d2 in the sub-scanning direction is calculated from the following equation and its result is shown on the display 58:

$$d2 = l2 \times n2 \qquad (4)$$

where l2 is a minimum distance of movement of the document table 11 per pulse in the pulse signal applied to the motor controller 54 for sub-scan control, and n2 is a count of pulses in the pulse signal applied to the motor controller 54.

Steps N7 and N8: When the projected image reaches the first point P1 of the trimming area TA, the operator operates the switch SW3 to give an interrupt command to CPU 50 through the interrupt control circuit 61. Upon receipt of this command, CPU 50 stores current pulse counts n1 and n2 in the RAM 53, and eliminates the counts n1 and n2 from counters within CPU 50 and from the displays 57 and 58.

Steps N9 through N12: After completing designation of the first point P1 of the trimming area TA, a second point P2 is designated. In this case, the projected spot image is moved from point P1 to point P2 by operating the switch SW1 for main scan control to drive the movable laser deck 41. As at steps N4 and N5, the number of pulses in the pulse signal applied to the motor controller 55 is counted, and distance of movement d3 from the first point P1 is shown on the display 57.

Steps N13 and N14: When the projected image reaches the second point P2, the operator operates the switch SW3. Consequently, a pulse count n3 for the movement of the projected image from point P1 to point P2 is stored in the RAM 53, and this count is eliminated from the counter within CPU 50 and from the display 57.

Steps N15 through N17: After completing designation of the second point P2 of the trimming area TA, a third point P3 is designated. In this case, the switch SW2 for sub-scan control is operated to move the projected spot image from point P2 to point P3. The number of pulses in the pulse signal applied to the motor controller 54 is counted, and distance of movement d4 from point P2 to point P3 is shown on the display 58.

Steps N18 through N21: When the projected image reaches point P3, the operator operates the switch SW3 again. As a result, a pulse count n4 for the movement of the projected image from point P2 to point P3 is stored in the RAM 53, this count is eliminated from the counter within CPU 50 and from the display 58, and the laser 40 is turned off.

Steps N22 and N23: The trimming area is derived from counts n1–n4 stored in the RAM 53, as follows:

An image loading range in the sub-scanning direction is determined by the number of pulses applied from CPU 50 to the motor controller 54 for the sub-scan control. That is, when a sub-scan is started at home position A1, count n2 stored in the RAM 53 is used to determine an image loading point in the sub-scanning direction, and count n4 to determine an image loading width (the number of lines) in the sub-scanning direction.

Steps N24 and N25: The trimming range in the main scanning direction is represented by the number of pixels of the CCD line sensor 18 based on pulse counts n1 and 13 taken in the main scanning direction. Assuming that the number of pixels N of the CCD line sensor 18 corresponds to the minimum distance of movement l1 of the laser deck 41, the number of pixels N1 corresponding to count n1 and representing an image loading point in the main scanning direction is derived from;

$$N1 = N \times n1 \tag{5}$$

and the number of pixels N3 corresponding to count n3 and representing an image loading range in the main scanning direction is derived from;

$$N3 = N \times n3 \tag{6}$$

The above trimming range data for the main scanning direction are stored in the RAM 53.

The trimming range data thus obtained are used as bases for reading image data. In the sub-scanning direction, image data are read from the CCD line sensor 18, starting with the (n2)th pulse and ending with (n2+n4)th pulse in the pulse signal applied from CPU 50 to motor controller 54. In the main scanning direction, image data are read from the CCD line sensor 18, starting with the (N1)th pixel counted from the foremost pixel and ending with the (N1+N3)th pixel.

Figure 14:
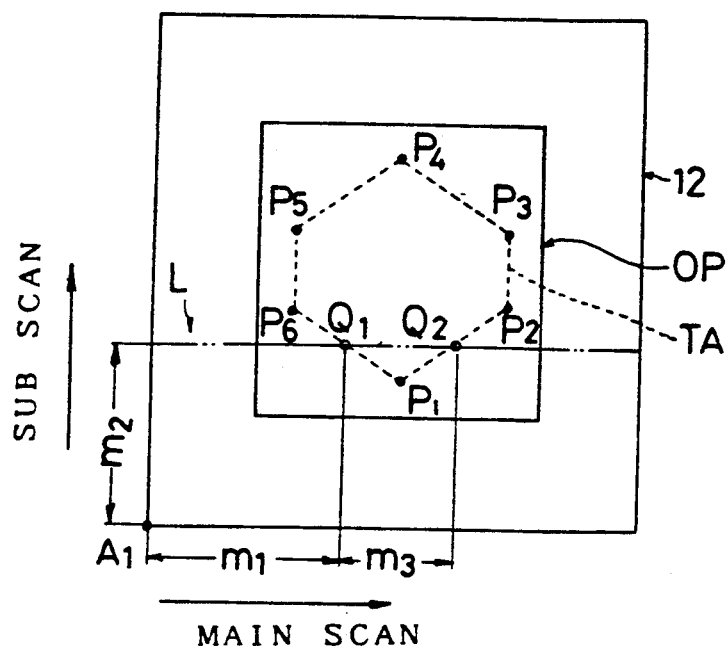
FIG. 14 is an explanatory view illustrating another example of trimming areas of the original designated on the apparatus shown in FIG. 9.
Figure 15:
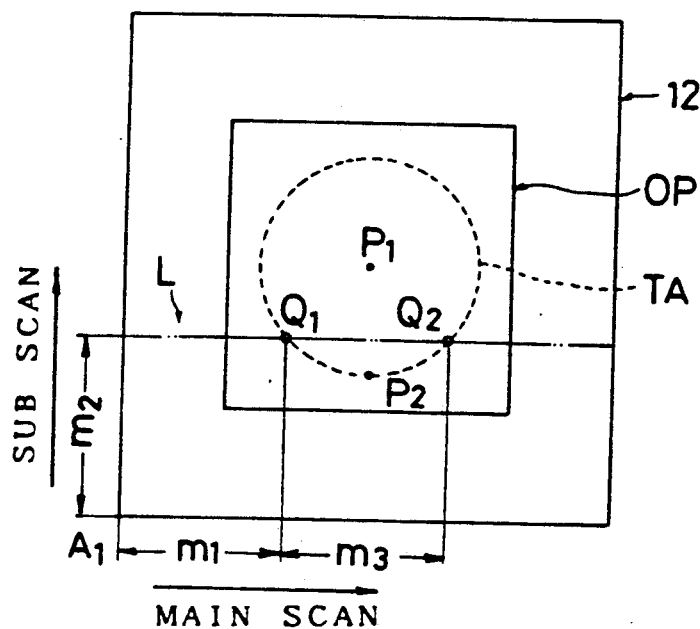
FIG. 15 is an explanatory view illustrating a further example of trimming areas of the original designated on the apparatus shown in FIG. 9.

The characterizing feature of this embodiment lies in the automatic designation of a trimming area based on movement, to key points relating to the trimming area, of the spot image projected back to the glass plate 12 of the document table 11. The shape of the trimming area designated and the method of calculating trimming area data are optional. When a polygonal trimming area TA is designated as shown in FIG. 14, for example, the projected spot image may be moved to points P1–P6 of the trimming area as in the foregoing embodiment. Then the trimming area is obtained by calculating coordinates (m1, m2) and (m1+m3, m2) of intersections Q1 and Q2 of segments linking these points and a sequential scan line L. When a circular trimming area TA is designated as shown in FIG. 15, the center point P1 and a given point P2 on its circumference may be used. The trimming area is then obtained by calculating coordinates of intersections Q1 and Q2 of a sequential scan line L and the circular trimming area TA.

To facilitate understanding, the foregoing embodiments have been described taking real-size reading of the original image for example. The present invention is applicable also where the original image is read in enlargement or reduction. When the zoom lens 17 is set to a given magnification M, the trimming area may be obtained by multiplying counts n1–n4 of the pulse signals by 1/M.

The spot light source is not limited to the visible semiconductor laser, but may comprise a bright light emitting diode whose light is taken through a spot aperture.

The device for moving the projected image on the document table in the main scanning direction need not move the spot light source itself. Instead, the document table may be moved in the main scanning direction while the spot light source is maintained stationary.

The document table 11 and movable laser deck 41 may be constructed switchable between high speed drive and low speed drive. Then the projected spot image may be moved at high speed to a location adjacent to a desired point of the trimming area, and thereafter moved to that point at low speed. This construction has the advantage of enabling the trimming area to be designated with increased speed and precision.

A transparent original has been employed by way of example in the foregoing embodiment. However, the present invention is applicable also for checking whether a reflection type original is within a trimming area or not.

In each of the described embodiments, half mirror 19 is used as the light reflecting device disposed on the optical path extending from the input optical system to the CCD line sensor. This half mirror 19 may be replaced by a fully reflecting mirror of the tiltable type or movable into and out of the optical path.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A flat bed scanning type image reading apparatus for projecting light flux from an original set on original setting means through an input optical system to a CCD line sensor, reading an image through the CCD line sensor in a main scanning direction, effecting a sub-scan by moving said original setting means and the light flux relative to each other, and effecting enlargement selection for a reproduction image by varying projecting magnification of the input optical system relative to the CCD line sensor, said image reading apparatus comprising;

light reflecting means disposed in an optical path extending from said input optical system to said CCD line sensor to cause a branching of said optical path, a linear light source disposed in the optical path branched out by said light reflecting means, at a position equivalent to said CCD line sensor with respect to said original setting means, said linear light source being equal in length to an effective pixel area of said CCD line sensor, and projected image moving means for moving an image of said linear light source projected back to said original setting means through said light reflecting means and said input optical system, relative to said original setting means in a sub-scanning direction.

2. The flat bed scanning type image reading apparatus as claimed in claim 1, wherein said projected image moving means includes means for moving said original setting means in said sub-scanning direction.

3. The flat bed scanning type image reading apparatus as claimed in claim 1, wherein said input optical system includes a group of reflecting mirrors and said projected image moving means includes means for moving the group of reflecting mirrors in said sub-scanning direction, said group of reflecting mirrors directing linear light emitted from said linear light source toward said original setting means.

4. A flat bed scanning type image reading apparatus for projecting light flux from an original set on original setting means through an input optical system to a CCD line sensor, reading an image through the CCD line sensor in a main scanning direction, effecting a sub-scan by moving the original setting means and the light flux relative to each other, and effecting an enlargement selection for a reproduction image by varying projection magnification of the input optical system relative to the CCD line sensor, said image reading apparatus comprising;

light reflecting means disposed in an optical path extending from said input optical system to said CCD line sensor to cause a branching of said optical path, a linear light source disposed in the optical path branched out by said light reflecting means, at a position equivalent to said CCD line sensor with respect to said original setting means, said linear light source being equal in length to an effective pixel area of said CCD line sensor, linear light source drive means for rotating said linear light source in a plane perpendicular to an optical axis thereof to a desired angle of rotation, displacement angle setting means for inputting the desired angle of rotation of said linear light source to said linear light source drive means, and projected image moving means for moving an image of said linear light source projected back to said original setting means through said light reflecting means and said input optical system, relative to said original setting means in a sub-scanning direction.

5. A flat bed scanning type image reading apparatus for projecting light flux from an original set on original setting means through an input optical system to a CCD line sensor, reading an image through the CCD line sensor in a main scanning direction, and effecting a sub-scan by moving the original setting means and the light flux relative to each other, said image reading apparatus comprising;

light reflecting means disposed in an optical path extending from said input optical system to said CCD line sensor to cause a branching of said optical path, a spot light source disposed in the optical path branched out by said light reflecting means, at a position equivalent to said CCD line sensor with respect to said original setting means, first drive means for moving a projection image of said spot light source projected back to said original setting means through said light reflecting means and said input optical system, on said original setting means in said main scanning direction, second drive means for moving said projection image on said original setting means in a sub-scanning direction, first detecting means for detecting distances of movement of said projection image in said main scanning direction, second detecting means for detecting distances of movement of said projection image in said sub-scanning direction, and trimming area calculating means for calculating a trimming area based on the distances of movement detected by said first detecting means and said second detecting means when said projection image is moved to selected locations relating to the trimming area of the original set on said original setting means.

* * * * *